United States Patent
Kaul et al.

(10) Patent No.: US 10,932,544 B2
(45) Date of Patent: Mar. 2, 2021

(54) PEN HAVING AN INTEGRALLY INJECTION-MOULDED COATING SLEEVE

(71) Applicant: A.W. Faber-Castell Cosmetics GmbH, Stein (DE)

(72) Inventors: Wolfgang Kaul, Heilsbronn (DE); Christina Zech, Ellingen (DE)

(73) Assignee: A.W. FABER-CASTELL COSMETICS GMBH, Stein (DE)

( * ) Notice: Subject to any disclaimer, the term of this patent is extended or adjusted under 35 U.S.C. 154(b) by 61 days.

(21) Appl. No.: 16/327,843

(22) PCT Filed: Aug. 10, 2017

(86) PCT No.: PCT/EP2017/070345
§ 371 (c)(1),
(2) Date: Feb. 24, 2019

(87) PCT Pub. No.: WO2018/036837
PCT Pub. Date: Mar. 1, 2018

(65) Prior Publication Data
US 2019/0200728 A1 Jul. 4, 2019

(30) Foreign Application Priority Data
Aug. 26, 2016 (DE) .................. 10 2016 115 872.0

(51) Int. Cl.
*B43K 19/16* (2006.01)
*B29C 45/16* (2006.01)
(Continued)

(52) U.S. Cl.
CPC .......... *A45D 40/20* (2013.01); *B29C 45/0001* (2013.01); *B29C 45/16* (2013.01);
(Continued)

(58) Field of Classification Search
CPC .... A45D 40/16; A45D 40/20; B29C 45/1634; B29C 45/1642; B29C 45/73;
(Continued)

(56) References Cited

U.S. PATENT DOCUMENTS 2,380,042 A * 7/1945 Hauton .................. B29C 45/062
425/129.1
3,704,071 A * 11/1972 Muller .................. B29C 44/322
401/96

(Continued)

FOREIGN PATENT DOCUMENTS

DE 2834479 A1 2/1980
DE 3137486 A1 4/1982
(Continued)

OTHER PUBLICATIONS

B.J. Keestra et al., Materials Technology, Dutch Polymer Institute, Eindhoven University of Technology, Eindhoven, The Netherlands "Two Component Injection Molding of Phase Separating Blends" 2006.

(Continued)

*Primary Examiner* — David J Walczak
*Assistant Examiner* — Bradley S Oliver
(74) *Attorney, Agent, or Firm* — Polson Intellectual Property Law, PC; Margaret Polson; Christopher Sylvain

(57) ABSTRACT

A pencil for applying a coloring and/or cosmetic substance, having a pigment core composed of the substance that is to be applied and a one-piece injection-molded casing encompassing the pigment core that is composed of a thermoplastic material that consists of a mix of a first plastic and a second plastic, wherein the casing, respectively viewed in the radial direction, has an outer enrichment zone with a higher concentration of the first plastic than in the middle region and the casing, respectively viewed in the radial direction, (Continued)

has an inner enrichment zone with a higher concentration of the first plastic than in the middle region.

23 Claims, 9 Drawing Sheets

(51) Int. Cl.
  *B29C 45/00* (2006.01)
  *B29C 45/73* (2006.01)
  *B29C 45/72* (2006.01)
  *B29L 23/00* (2006.01)
  *B29K 21/00* (2006.01)
  *B29L 31/00* (2006.01)
  *A45D 40/20* (2006.01)

(52) U.S. Cl.
  CPC .......... *B29C 45/1634* (2013.01); *B29C 45/73* (2013.01); *B43K 19/16* (2013.01); *B29C 45/72* (2013.01); *B29C 2045/0037* (2013.01); *B29K 2021/003* (2013.01); *B29K 2995/002* (2013.01); *B29L 2023/00* (2013.01); *B29L 2031/718* (2013.01)

(58) Field of Classification Search
  CPC . B29L 2031/7254; B43K 19/02; B43K 19/14; B43K 19/16
  See application file for complete search history.

(56) References Cited

U.S. PATENT DOCUMENTS

| | | | |
|---|---|---|---|
| 3,875,088 A * | 4/1975 | Arons | B29C 44/322 521/134 |
| 3,993,408 A * | 11/1976 | Arons | B43K 19/14 401/96 |
| 4,413,921 A | 11/1983 | Fotiu et al. | |
| 5,360,281 A | 11/1994 | Kamen et al. | |
| 6,241,409 B1 * | 6/2001 | Holloway | B43K 19/14 401/49 |
| 6,352,426 B1 * | 3/2002 | Hutchinson | B29C 45/045 425/548 |
| 6,409,402 B2 * | 6/2002 | Tani | A45D 40/16 401/88 |
| 6,864,320 B2 | 3/2005 | Ogawa et al. | |
| 6,935,800 B2 | 8/2005 | Hetzel | |
| 8,998,519 B2 * | 4/2015 | Patel | B43K 19/00 264/172.15 |
| 10,596,737 B2 * | 3/2020 | Mita | B29B 15/12 |
| 2001/0048839 A1 | 12/2001 | Tani et al. | |
| 2010/0207071 A1 * | 8/2010 | Patham | B29C 45/0013 252/500 |
| 2012/0237708 A1 * | 9/2012 | Caviezel | B43K 19/16 428/36.5 |
| 2012/0308290 A1 | 12/2012 | Ito | |
| 2013/0121747 A1 | 5/2013 | Biebuyck et al. | |
| 2019/0191848 A1 | 6/2019 | Kaul et al. | |

FOREIGN PATENT DOCUMENTS

| | | |
|---|---|---|
| DE | 10106834 A1 | 10/2001 |
| DE | 102004021048 A1 | 11/2005 |
| DE | 102006030339 A1 | 3/2007 |
| EP | 0613634 A2 | 2/1994 |
| EP | 2390294 A1 | 11/2011 |
| JP | H06-255294 A | 9/1994 |
| WO | 9823433 A1 | 6/1998 |

OTHER PUBLICATIONS

International Search Report dated Mar. 1, 2018 in parent International application PCT/EP2017/070345.

International Preliminary Report on Patentability dated Dec. 18, 2018 in parent International application PCT/ EP2017/070345.

Opposition to related German application 102016115872B4 filed in Germany on Dec. 17, 2018 by Schwanhäuser Industrie Holding GmbH & Co. KG. English machine translation (via Google Translate) provided.

B.J. Keestra et al., Materials Technology, Dutch Polymer Institute, Eindhoven University of Technology, Eindhoven, The Netherlands "Two Component Injection Molding of Phase Separating Blends".

N.O-Charoen et al., Advanced Fibroscience, Kyoto Institute of Technology, Matsugasaki, 606-8585, Kyoto, Japan, "Determination of Different Morphological Structures in PC/ABS Open Spiral Injection Moldings", Polymer Engineering and Science—2008, 787-794.

Römpp Chemielexikon, Herausgeber Prof. Dr. Jürgen Falbe und Prof. Dr. Manfred Regitz, Georg Thieme Verlag, 9. Auflage, Band 5 (1992), S.4258 Stichwort "Spritzgiessen".

Gan-Ji Zhong et al., Polymer Engineering and Science, 2005, 1655-1665, Injection Molding-Induced Morphology of Thermoplastic Polymer Blends.

Office Action dated Apr. 10, 2020 in U.S. Appl. No. 16/327,844 (11 pages).

* cited by examiner

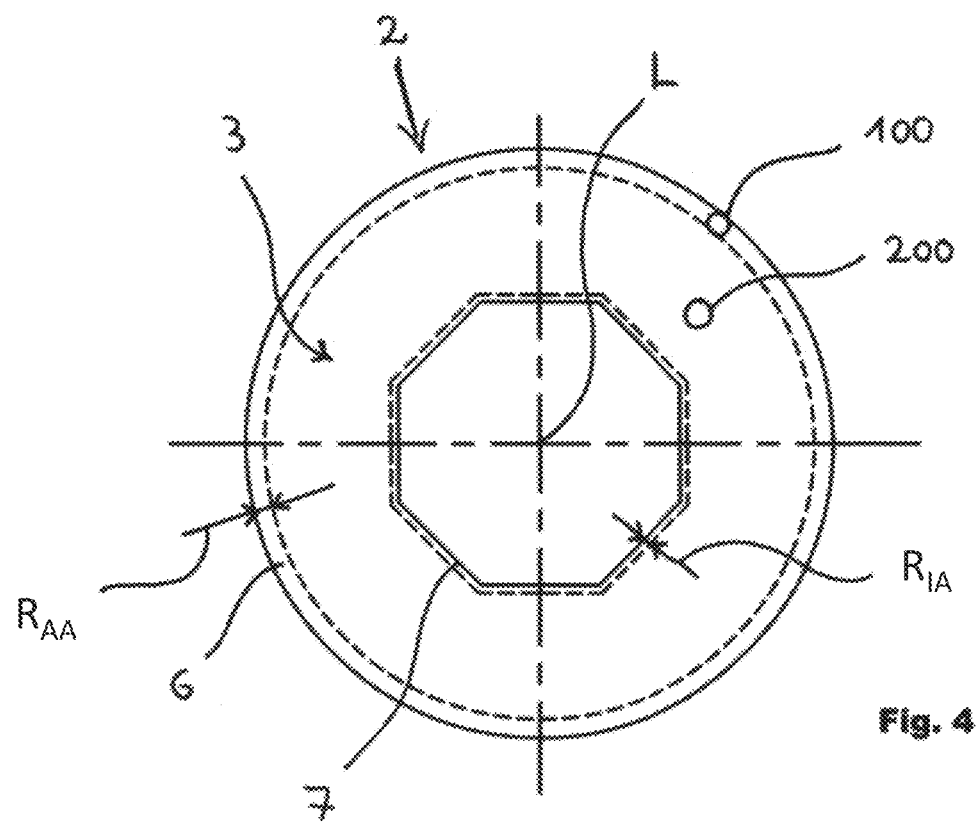

PEN HAVING AN INTEGRALLY INJECTION-MOULDED COATING SLEEVE

BACKGROUND

The present disclosure relates to a sharpenable pencil, in particular a cosmetic pencil, and a method for the production thereof.

Cosmetic pencils in which the pigment core is enclosed in a wooden pencil casing are widely used. The wooden pencil casings can be easily sharpened and resharpened by hand with the aid of a sharpener, which functions according to the principle of a pencil sharpener.

The production of wooden pencil casings, however, is by nature quite expensive. It requires shaping wooden slats, gluing them, and then separating them by milling.

In situations in which pencils have to be produced not as graphite pencils or colored pencils, but rather as cosmetic pencils, other specific problems arise.

Cosmetic pencils usually require a higher quality of wood than colored pencils. This is because as a rule, cosmetic pencils need to have a smoother tip. Cosmetic pencils also require a more or less costly surface finish. The individual pencils are usually painted or coated one or more times. This is because specifically as compared to an individual colored pencil, high-priced cosmetic pencils must optically and haptically give customers the impression of particularly high quality.

A typical method for producing such pencils, which is noncritical with regard to the pigment core compound as such, consists of extruding a suitable pigment core compound and gluing it into grooved slats or inserting it into plastic casings. This method corresponds to the method that has proven valuable in the production of colored pencils. In this extrusion method, it is disadvantageous that as a rule, it is only possible to use pigment core compounds that yield relatively hard pigment cores. This is because the pigment cores must remain manageable during the additional processing—pigment cores that are too soft run the risk of deforming when they are inserted into the slats that are to be subsequently glued together. Hard pigment cores, however, are often undesirable specifically in cosmetic pencils because they exhibit a so-called harder application in that a satisfactory quantity of cosmetic can only be drawn from them by exerting a relatively high pressure.

Because of this, a different method for producing the pigment core is often used in cosmetic pencil production. In this method, the cosmetic compound is poured in a hot state into prefabricated shaft casings with a concentric hole in which the pigment core compound cools. But here, the problem arises that cosmetic compounds can contain a relatively high percentage of components that are volatile (in the hot state). Even in the cooled state, these volatile components tend to diffuse or migrate, at least over time.

In cosmetic pencils with soft pigment cores of this kind, it is therefore necessary to also perform a separate pretreatment of the inner surface of the wooden pencil casing that contains the pigment core—if a wooden casing is even to be used in the first place. Special steps must be taken because it is necessary to prevent volatile components of the pigment core from diffusing into the wood or even from migrating within the wood and thus being drawn from the pigment core and possibly damaging the paint on the outer surface. This problem can even also occur with plastics, particularly with foamed plastics. Volatile components can even diffuse into plastics and, if they have penetrated the plastic intensively enough after some time, may possibly damage the outer surface.

In order to remedy this problem, the German patent application DE 2 834 479 proposes constructing a cosmetic pencil with a grease-based pigment core, which is provided with a metallic sheath before it is introduced into the casing. A metallic sheath does produce a good barrier, but incurs unnecessary expense. It is also troublesome when sharpening the pencil. The metallic sheath can indeed be made very thin and provided in the form of a foil, so to speak. But the long, narrow strips of foil that are cut by the sharpener tend to become tangled because unlike trimmed-off wooden shavings, no breakage of the shavings occurs in this case.

The German patent application DE 31 37 4 86 A1 is devoted to the same problem. It proposes introducing the pigment core into a tube made of a sharpenable plastic material; the tube is coated on the outside with a layer that is impermeable to solvents, for example in the form of a plastic film made of polyester. Such a design is not only expensive, but also cannot meet the high optical and haptic requirements that are placed on a cosmetic pencil. In addition, the film, if it is installed in the form of heat-shrink tubing, can wrinkle or produce generally undesirable overlaps. The incorporation of a plastic film is also problematic because the plastic film is cut into during sharpening and is not always cut off cleanly so that the sharpened end runs the risk of quickly becoming unsightly. In addition, the problem of the lack of shaving breakage arises, which has already been described above in relation to the metal foil. These problems are known to the person skilled in the art, even if the patent application in question says nothing about sharpenability.

European patent EP 0 613 634 B1 is also devoted to this problem. It proposes producing a combined pencil casing, which consists of a thin-walled plastic tube that is inserted into the receiving opening of the actual pencil casing. After the assembly of these two parts, the pigment core is then poured in. Obviously, the task of the inserted thin-walled plastic tube is to seal the pigment core and to remain dimensionally stable beyond the casting temperature of the pigment core. Because it is thin-walled, it does not stand in the way of the sharpening even if a comparatively hard plastic is used. On the other hand, an easily sharpenable plastic can be used for the actual pencil casing, which does not have to make allowances for the diffusion behavior of the pigment core components.

In general, producing one-piece pencil casings out of plastic involves conflicting objectives on a number of levels.

First of all, it is necessary to use a plastic that is soft enough to permit sharpening with a sharpener that functions according to the principle of a manual pencil sharpener. Then, the plastic must at the same time be dimensionally stable beyond the casting temperature of the pigment core. Finally, the plastic must produce the most attractive possible surface, in order to provide the desired optical, haptic, and high-quality appearance with the least possible amount of finishing work.

In this respect, in order to find a workable compromise, often plastics that are inherently relatively hard are used for producing the pencil casing. These have the necessary durability. The sharpenability in this case is usually insured by the fact that the plastics are foamed. Foamed plastics, however, cannot be processed by injection molding, instead making it necessary to produce the pencil casing by means of extrusion. The foaming and the extrusion, however, cause the surface quality to suffer so that pencil casings of this kind are not easy to sell without finishing treatment.

One example of this is U.S. Pat. No. 5,360,281, which claims protection for pencil casings made of foamed plastic. This patent does indeed also mention the concept of producing pencil casings by means of injection molding, but the concept was not incorporated into the claims—clearly because the proposed plastics exhibit an excessively poor sharpenability when not foamed.

Finally, US patent application 2013/0121747 A1 should also be mentioned, whose stated object is to produce pencils with a pencil casing that is particularly reliable from a chemical and mechanical standpoint. The intent is to achieve this by choosing a plastic mix that does not release any VOC during production and use and which breaks in a splinter-free way so that the corresponding pencils are also suitable for small children. In addition, the pencils should also be easy to sharpen.

In order to solve this problem, this US patent proposes producing the pencil casings from a plastic mix that consists of
at least one styrene-butadiene copolymer,
at least one styrene-butadiene-styrene block copolymer,
and at least one other plastic from the group of styrene polymers, styrene-acrylonitrile polymers, acrylonitrile-butadiene-styrene polymers, acrylic styrene methyl methacrylates, or a combination of the above-mentioned plastics,
as well as at least one auxiliary material.

This US patent application does not address the above problems in the production of cosmetic pencils. In particular, the application does not address either the problems that arise during pigment core casting or the problem of how a high-quality outer surface can be achieved. This US patent also does not provide any satisfactory solution to the problem recognized therein of the migration of pigment core components. The US patent proposes counteracting the drying-out of pigment cores with volatile components by adding waxes to the plastic mix from which the casing is produced. This solution, however, is insufficient particularly in the cosmetic sector since it is not possible to guarantee that the technical waxes that are added to the plastic will not themselves migrate into the pigment core, which is undesirable because only cosmetically approved, harmless substances can be added to the pigment core.

SUMMARY

By contrast, in a first step, an aspect of the present disclosure is to disclose a pencil that is for applying a coloring and/or cosmetic substance, that has a one-piece casing consisting entirely of plastic, that can be sharpened preferably using a pencil sharpener, and has a preferably glossy high-quality outer surface, which requires no further finishing after the injection molding except for the attachment of a possible label or other mostly localized decorations.

The pencil according to the present disclosure has a pigment core composed of the substance that is to be applied, with or without volatile components, and encompassing the pigment core, a one-piece, single-substance injection-molded casing that is composed of a thermoplastic material that consists of a mix of a first plastic and a second plastic, each of which, in pure form, has different properties.

In the context of the present disclosure, injection molded "of a single substance" means that only a single material (even if it is composed of a mix) has been injected into the mold cavity, usually in a single shot or in exceptional cases, in several successive shots. This contrasts with "overmolding" in which a first material is first injected into the mold cavity and then—from a different material supply—a second material that has other properties is injected onto it.

The pencil according to the present disclosure features the fact that the first and second plastics are chosen so that they partially separate as a result of the injection molding and thus form a casing, which, viewed in the radial direction, has a higher concentration of the first plastic in the region of its surface of the outer circumference (outer enrichment zone) than in the middle (central depletion zone). At the same time, the first and second plastics are chosen so that the casing also has a higher concentration of the first plastic.

The pencil according to the present disclosure also features the fact that it can be sharpened using a sharpener that functions according to the principle of a pencil sharpener, i.e. by rotating the pencil by hand.

To make the determination according to the present disclosure as to whether a pencil is sharpenable, there are various alternative criteria that in the ideal case, are cumulatively fulfilled:
With the manual sharpener at the end of the pencil, whose continuous cone corresponds to the angle at which the sharpener blade is positioned, it is possible three times in immediate succession to remove a continuous shaving over at least five or better still at least eight full pencil rotations. In other words, the shaving forms a continuous curl, preferably with a thickness that remains constant over the entire length (fluctuating by +/−10%) and ideally without a thickness increase of more than 15%, or better still only 10%, being observed toward the end of the shaving.
The generally conical cut surface that such a sharpener leaves behind is preferably uniformly smooth in this case. Apart from local step edges that can mark the position reached by the sharpener blade when the sharpening procedure is terminated, it preferably has no local break-outs, chipping, or steps, for example in the form of chatter marks or in any case does not exhibit any local break-outs, chipping, or steps with a depth of more than 0.3 mm.

It is generally the second plastic, which is chosen so that it ensures that the casing can be sharpened by means of a sharpener like a pencil sharpener. The measure for this is a comparison to a pencil that has an identically dimensioned casing, which is entirely composed of the first plastic and cannot be sharpened in the above-described way.

Thus in one go, so to speak, a multi-layer casing is obtained, which up to this point, could only be produced with a significantly more complex overmolding method in which first, the one casing part is injection molded out of the first material and then, after the removal of movable sliders, the second casing part is injection molded onto it out of the second material.

The pencil according to the present disclosure features the fact that the properties that are inherent to the first plastic in its pure form are distinctly accentuated due to the enrichment of this first phase at the surface of the outer circumference and inner circumference, which enrichment is forced into existence with the aid of the injection molding process, even if a certain percentage of the second plastic is still present right at the respective surface. In this way, the first plastic, in one and the same original forming process, produces a layer with a high surface quality on the surface of the outer circumference of the pencil casing. With a correct choice of the first plastic, the surface—viewed with the naked eye—can be absolutely flat and as smooth as glass. In addition, on the surface of the inner circumference of the pencil casing, a layer is formed that performs a barrier function. This barrier function will be explained in greater detail later. It has a positive influence on the casting of the pigment core and/or on the shelf life of the pigment core.

According to the present disclosure, a sharing of tasks is provided here. The first plastic is chosen so that an outstanding surface quality can be achieved. If the first and second plastics are correctly matched to each other so that the necessary mix is produced, then it is thus possible to achieve a surface that exhibits a mirror-like shine comparable to the shine of the finish on a piano.

It is not necessary to take into account sharpenability when choosing the first plastic. This is because the outer enrichment zone—in which the first plastic is preferably enriched to more than 80% by weight or better still enriched to more than 90% by weight on the outside—can be kept thin in the radial direction, if need be much thinner than in overmolding.

The same is mostly true for the inner enrichment zone in which the first plastic is enriched to at least ≥70% by weight on the inside.

Ideally, the dimension RAA and/or RIA of the outer and/or inner enrichment zone is 0.075 to 0.5 mm or better still only up to 0.35 mm, measured from the surface of the outer circumference and/or inner circumference toward the inside in the radial direction. As a result, the first plastic does not hinder the sharpenability, even though it tends to have a rather poor machinability.

For the achievement of the respective function, it has turned out to be advantageous if the inner enrichment zone has a slightly smaller radial dimension RIA than the outer enrichment zone, whose radial dimension is RAA. In other words, preferably the following applies: RAA>RIA and ideally even RAA>RIA*12/10.

With a correspondingly intensive cooling of the injection mold at the place in which it forms the outer enrichment zone, it is possible to achieve the fact that the exposed surface of the outer enrichment zone consists, at least up to 95% by weight, in some cases even up to 97% by weight and more, of the first plastic (and the pigments possibly incorporated into it).

Within the entire outer enrichment zone, the percentage of the first plastic is ≥80% by weight or significantly better still, ≥90% by weight.

With a correspondingly intensive cooling of the injection mold at the place in which it forms the inner enrichment zone, it is possible to achieve the fact that the percentage of the first plastic within the entire inner enrichment zone is at least ≥67% by weight or better still, ≥70% by weight.

Correspondingly, this is generally accompanied by a central depletion zone. Within this central depletion zone, which is in the middle of the casing, the local percentage by weight of the first plastic is reduced relative to the percentage by weight that the first plastic had in the injection molding mix that was prepared for the injection molding. In any case, the expression "the middle of the casing" means a region of +/−0.75 mm or at least +/−0.5 mm around the region of the radius that is calculated as the average of the radius at the surface of the outer circumference and the radius at the surface of the inner circumference; the average radius is used in the event of non-round contours.

Depending on the percentage of the first plastic in the plastic compound that is injection molded into the mold cavity, the percentage of the first plastic within the entire central depletion zone is preferably at least ≤60% by weight or better still, ≤55% by weight.

By contrast, for the second plastic, a plastic can be chosen that, in the places in which it is definitively involved in the formation of the plastic structure, it reduces the strength of the first plastic even if the first plastic possibly makes up the larger percentage by weight of the overall mix. Thus when choosing the second plastic, it is not necessary to take into account its surface quality and/or the barrier-forming capacity relative to pigment core components since the second plastic is not definitively involved in the formation of the surfaces.

The production of the casing of the pencil by means of injection molding lends the pencil a particular physical property in the present case. This is because in this instance, the injection molding itself causes the first plastic to be enriched at the surface of the outer circumference, thus forming the surface that possibly has a finish like a piano—even though the first and second plastics were uniformly mixed before being injected into the injection mold.

It is true that the reasons why such a segregation occurs have not yet been completely explained. It is nevertheless clear that when the mix of the first and second plastics, which is injected into the mold, comes into contact with the well-cooled surface of the mold cavity, this initially results in an abrupt cooling. This cooling causes a segregation to occur because the one plastic solidifies more quickly than the other plastic.

In this way, the well-cooled surface of the mold cavity is coated with a layer that entirely or predominantly consists of the first plastic. The resulting layer is usually very hard or harder than the underlying core since the percentage of the second plastic contained therein cannot produce a definitive disrupting effect.

Since the above-mentioned layer, because of its poor thermal conductivity, constitutes an insulation, a further abrupt cooling is prevented. This results in the fact that below the above-mentioned layer, the separation decreases, usually in rapid fashion. In the middle, therefore, the mix of the first and second plastics as such is also retained in the course of the solidification, even if as a rule, a change in the percentages by weight is observed. Since the second plastic disrupts the structure, the solidified layer is less strong in this region than the above-mentioned layer, which has formed against the cooled surface of the mold cavity.

The term sharpener or pencil sharpener in this case refers to the classic pencil sharpener of the kind that is used for graphite pencils, colored pencils, and cosmetic pencils. Such a pencil sharpener has a body made of metal, wood, or plastic, which has a conical opening for the tip of the pencil that is to be sharpened and at least one blade, which removes a shaving from the tip when the pencil is rotated by hand.

The term thermoplastic material in this case refers to a material, which, by heating, can be brought into a viscous state in which it can be injection molded. The term covers classic thermoplastics and TPEs.

The first and second plastics are chemically different, i.e. generally belong to different material classes or plastic types.

The above definition of the different terms also applies to that which is stated below unless otherwise clearly indicated by the context.

Additional Modifications

The concentration of the first plastic preferably decreases continuously from the outer enrichment zone and from the inner enrichment zone toward the middle.

This distinguishes the pencil according to the present disclosure or more specifically its multi-layer casing, from known casings, which only obtain their two-layer or multi-layer nature because a continuous additional plastic layer, a continuous film, a continuous paint layer ("piano finish"), or the like has been applied.

Naturally, at the end, the casings according to the present disclosure can also be provided with additional layers of plastic or paint, in particular for partial additional decoration, and with foils, e.g. for labeling purposes.

Preferably, the casing is composed of both the first and second plastics across its entire cross-section, but with the two plastics being found in percentages by weight that differ from one location to another, generally in such a way that the percentages by weight change continuously along the cross-section (viewed in the radial direction). In some cases, the term "overall cross-section" does not include the boundary layer in the region up to 0.2 mm below the surface of the outer circumference. The same is true for the boundary layer in the region up to 0.2 mm below the surface of the inner circumference.

Ideally, the casing has a separate layer only in the vicinity of the surface, e.g. in the form of the removable skin explained below, and does not have a slate-like structure over the entire cross-section. This is because this would undesirably increase the tendency for the shaving that is peeled off during sharpening to spontaneously disintegrate into extremely fine crumbs and thus cause soiling even of the cosmetic pigment core.

The barrier layer can be a mechanical barrier layer that is very smooth and thus prevents air inclusions from occurring during the pouring of the pigment core—of the kind that are frequently observed when pigment cores are poured into wooden casings whose inner surface is relatively rough.

Instead of this or at the same time, the barrier layer can be a chemical barrier layer, which is clearly preferable. Such a barrier layer features the fact that it restricts migration of pigment core components. Depending on the choice of the first plastic, this particularly limits the migration of isoparaffins and silicones and/or the migration of water and polar volatile substances such as alcohols. It achieves this if it reduces the migration to such an extent that no perceptible harm (hardening/drying) to the pigment core is observed even after storage for 12 months at a constant temperature of 23° C. In any case, one speaks of a barrier layer in the narrower sense when in relation to isoparaffins and silicones and/or in relation to water and polar volatile substances such as alcohols, the first plastic (in pure form) has a lower diffusion coefficient than the second plastic phase in pure form.

It has turned out to be particularly advantageous to use as the first plastic a weakly polar plastic with an electronegativity difference $\Delta EN$ in the range between 0.3 and 0.5 inclusive, but which contains a monomer component or a block that enables weak interactions with another strongly polar plastic so that an immediate, spontaneous separation is prevented. The term electronegativity difference $\Delta EN$ is understood here and below to mean the maximum electronegativity difference between adjacent atoms in the polymer structure.

In this case, it is particularly advantageous to use a plastic from the class of styrene acrylonitriles or acrylonitrile-styrene copolymers (abbreviation: SAN, nomenclature here and throughout in accordance with DIN EN IDSO 18064), preferably in pure form. SAN is weakly polar, but by means of the acrylonitrile component within it, can also have interactions with other strongly polar plastics.

A preferable composition consists of 65% by weight to 80% by weight styrene and of 20% by weight to 35% by weight of acrylonitrile components as well as respectively different molar masses. A particularly advantageous composition consists of 70% by weight styrene and 30% by weight acrylonitrile components (each with a tolerance of +/−1.5%). Ideally, the styrene acrylonitrile sold under the brand name "LURAN 378P™" by the company BASF SE, Ludwigshafen, Germany, is used.

Styrene acrylonitriles and to a particular degree, LURAN 378P™, in the form in which they are (not at all or essentially not) mixed with other plastics, are characterized by their chemical resistance, particularly even relative to amines, which are frequently used as neutralizing agents in cosmetic compounds. Styrene acrylonitriles and to a particular degree, LURAN 378P™, are also characterized by their dimensional stability in the presence of heat. These properties are used here in connection with the separation according to the present disclosure in the course of the injection molding in order to lend the surface on the inner circumference of the casing its superior properties.

At the same time, styrene acrylonitriles and to a particular degree, LURAN 378P™, are characterized by their exquisite appearance on the surface, which is used here in connection with the separation according to the present disclosure in the course of the injection molding in order to lend the surface on the outer circumference of the casing the necessary surface quality.

In a known way, styrene acrylonitriles and to a particular degree, LURAN 378P™ inherently exhibit a high strength, in particular a high scratch resistance, and are brittle. Sleeves made of pure styrene acrylonitriles therefore cannot easily be sharpened using a pencil sharpener and the normal exertion of force.

According to the present disclosure, the second plastic is chosen so that it weakens the strength of the first plastic in the places where the casing does not need to be characterized by the special properties of the first plastic.

In general, it can be said that the second plastic should preferably be a plastic, which, in the course of the injection molding, separates out from the SAN by means of separation phenomena and is inherently wetted physically by means of microphase separation, by forming partially crystalline regions.

Preferably, the second plastic is a polar plastic with an electronegativity difference $\Delta EN$ in the range between >0.5 and 1.7.

It has turned out to be particularly advantageous to use a plastic from the class of polar thermoplastic elastomers (abbreviation TPE-ET), preferably in pure form, as the second plastic.

In particular, the TPE-ETs that are used are those that employ a polyether group as a soft segment. It has turned out to be particularly advantageous to use the members of this class belonging to the sub-class of polar thermoplastic polyester elastomers or polar thermoplastic copolyesters (abbreviation TPC-ET). Typically, this plastic consists of a block copolymer with alternating hard and soft sections and the chemical interactions are essentially ester-based and/or ether-based dipolar interactions. Ideally, what is used is the polar thermoplastic copolyester produced under the brand name "Arnitel EM400™" by the company DSM Engineering Plastics BV, Urmonderbaan 22, 6167 RD Geleen, The Netherlands.

The astonishing thing is that the mix of the above-described first and second plastics, in the place where it has not extensively separated (in the sense that the SAN concentration does not fall below 90% by weight), has a lower strength than would be expected of the individual components. This results in a good sharpenability. In this case, the only limited resistance of the second plastic here to the volatile components of soft pigment core compounds does not matter since the first plastic on the surface, which comes into direct contact with the pigment core compound, constitutes a barrier layer, as explained above. Furthermore, it also does not matter that a mirror-like surface cannot be achieved with a TPE or TPC-ET.

Alternatively a plastic from the class of acrylonitrile ethylene propylene styrenes (AES) can be used as the first plastic.

Ideally, the acrylonitrile ethylene propylene styrene sold under the brand name "ROTEC A702™" by the company ROMIRA Gesellschaft für Vertrieb & Verarbeitung von Chemieprodukten mbH, Pinneberg, Germany is used.

In principle, it also seems to be conceivable to use a system in which the first plastic has a weight proportion of 20% by weight to 80% by weight, the second plastic has a weight proportion of 80% by weight to 20% by weight, and the fillers or auxiliary materials have a weight proportion of 0% by weight to 30% by weight or better still, only up to 15% by weight. Impurities of any kind are undesirable and are preferably avoided above the per mil range, in particular above 15 per mil by weight. To the extent that this is not possible in the individual case, impurities of up to 5% by weight or better still, up to 2.5% by weight, can be tolerable.

In order to achieve the effect according to the present disclosure, however, it has turned out to be particularly advantageous to set up the system such that the first plastic has a weight proportion of at least 45% by weight or better still, at least 55%. Usually, the recommended upper limit for the first plastic is then 75% by weight or better still, 65% by weight auxiliary materials and pigments with a weight proportion of up to 15% or better still, only up to 5%.

Astonishingly, it has turned out that adding other plastics to the binary system (composed of SAN or AES and TPE-ET or TPC-ET) can have a negative impact on whether it has the simplest possible adjustability. For this reason, the first and second plastics constitute at least the predominant part of the plastics used for the casing. This means that the casing according to the present disclosure consists of the first and second plastics in that these phases constitute the overwhelming part of the plastic compound or in some cases, at least 90% by weight of the plastic compound used. The best case is the one in which the first and second plastics and the pigments and auxiliary materials—or just the two plastics together with the pigments that are added to them—constitute the entire plastic compound used for the casing, apart from impurities.

Otherwise, as stated above, fillers that influence the plastic matrix but are not involved in its structure and auxiliary materials such as pigments can be added. Gas-forming agents or foaming agents in quantities that negatively affect the injection molding are to be avoided, preferably completely avoided.

The auxiliary materials also include plastic constituents, which, depending on the type of auxiliary materials, are merely poured into the matrix of the first and second plastics and are not melted in the course of the injection molding, for example a cross-linked elastomer or thermosetting polymer that is added in a ground form as a filler. Preferably, though, such fillers, which are themselves composed of plastic, are avoided since they can increase the viscosity and can hinder the separation.

Preferably, the first plastic is chosen so that at the outer circumference surface, the casing has a mathematically determined gloss level GU of more than 30 GU or better still, more than 40 GU. The measurement is performed in accordance with ISO 2813 along a span of 10 mm at 10 evenly spaced measurement points in the direction along the longitudinal axis L at a measurement angle of 60°.

Other effects, advantages, and embodiment possibilities of the present disclosure can be inferred from the embodiments described below.

BRIEF DESCRIPTION OF THE DRAWINGS

FIG. 4 shows a section perpendicular to the central longitudinal axis through the casing of a pencil according to the present disclosure.

DETAILED DESCRIPTION

First Embodiment

For the first embodiment, 60% by weight SAN (LURAN 378P™) and 40% by weight TPC-ET (Arnitel EM400™) with the addition of 3% pigments (preferably black pigments of the usual type carbon black CI 77266, which is available from various companies) are brought into the injection molding-ready, viscous state at a temperature of preferably 250° C.+/−10° C. and are uniformly mixed in the process. No other fillers or auxiliary materials are added. An extruder from the company Leistritz, 90459 Nuremberg, Germany, can be used for this.

The actual injection molding procedure can be carried out with an injection molding machine of the E-motion 940/160T type made by the company Engel, 90451 Nuremberg, Germany. The prepared compound is shot into the molding cavity of the injection mold at an injection pressure of approx. 1400 bar. The injection mold in this case is cooled by means of a liquid medium, which flows through the injection mold—sealed off from the mold cavity. In particular, the core pin of the injection mold, which forms the cavity that is provided to subsequently accommodate the pigment core in the casing, is itself directly cooled by the liquid medium. In other words, the cooling medium flows through the core pin itself.

Then the demolding is carried out, preferably by removing the core pin and the casing together from the mold cavity and then sliding the casing off of the core pin.

The casing 2 produced in this way particularly preferably looks like the one shown in FIG. 1; the structural details of the casing 2 will be discussed in greater detail below.

The casing produced in this way exhibits an extremely scratch-resistant outer circumference surface with a finish like a piano. It is very resistant to the migration of pigment core components and is easy to decorate.

Figure 1:
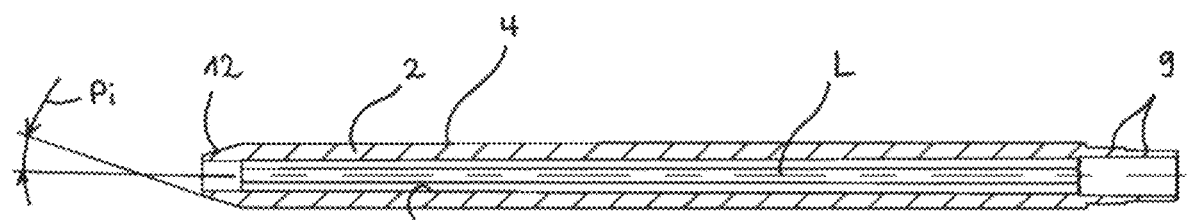
FIG. 1 shows the casing of a pencil according to the present disclosure in a longitudinal section through the center.
Figure 3:
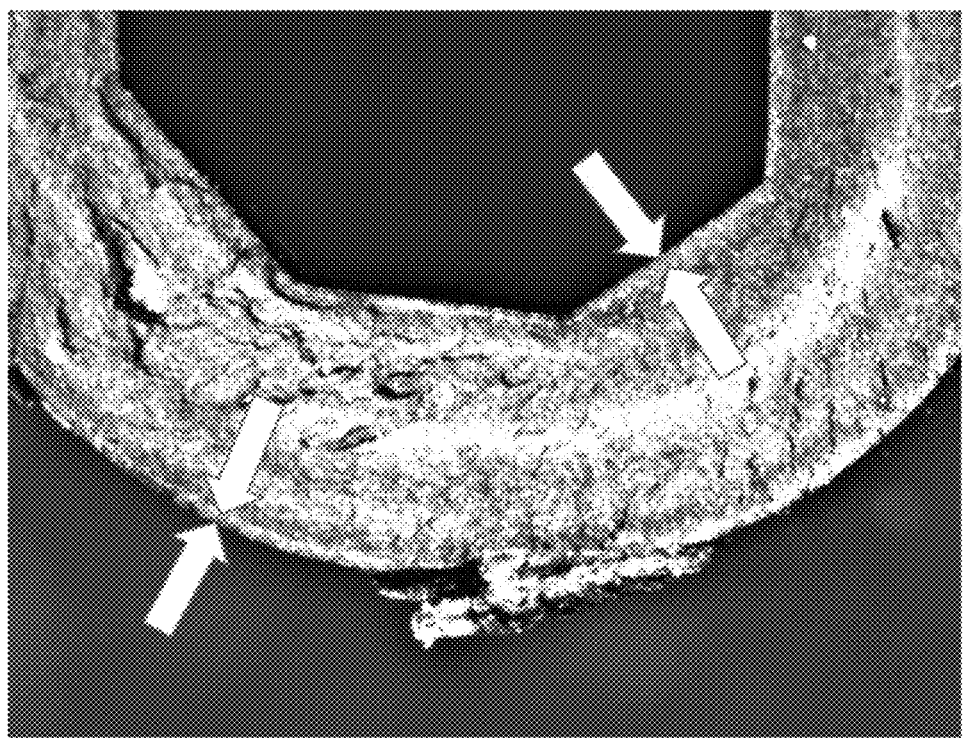
FIG. 3 is an enlarged detail and shows a part of the fracture plane of a casing that has been torn apart along its longitudinal axis.

In order to obtain a cross-section that permits visual inspection, the casing 2 according to FIG. 1 was clamped into a tensile testing machine and torn into two halves by means of correspondingly high tensile forces in the direction along its longitudinal axis L. FIG. 3 shows an enlarged detail of the resulting fracture plane of the cross-section 3, in an initial visual assessment by microscope.

It is already clear from FIG. 3 that a different layer has formed on and directly under the surface of the inner circumference 5 and the outer circumference 4. This finding was verified with measurements using RAMAN spectroscopy, as explained in detail below. The results of this are shown in FIG. 4.

As is apparent, the one outer enrichment zone 6 and an inner enrichment zone 7 are discernible. The characteristics of the outer enrichment zone 6 and inner enrichment zone 7 can be influenced by means of the temperature of the surface that is produced inside the mold cavity. The colder the corresponding surface of the mold cavity is at the beginning of the injection, the more pronounced the separation is. This also applies to the inner enrichment zone 7. As already mentioned above, the temperature of the core pin that produces the inner enrichment zone can be controlled by providing a more or less intensive flow of the cooling medium through the core pin itself.

In the present instance, within the limits of measurement accuracy using RAMAN spectroscopy, no amount of the second plastic can be found on the exposed surface of the outer enrichment zone. This is not only desirable in the context of this embodiment, but is also generally preferred. This is because such a formation is advantageous for achieving the glossy surface desired here, which resembles the finish of a piano. In the radially inward direction below the exposed surface, the percentage of the first plastic begins to decrease. Down to a depth of approximately 0.2 mm, however, a percentage of the first plastic of more than 90% by weight is present.

Figure 5A:
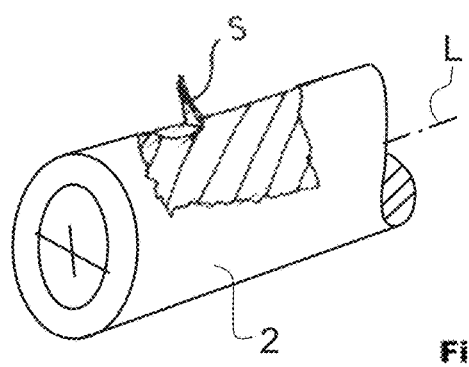
FIG. 5a shows an overview of the skin detachment test at the beginning, after the incision.
Figure 5B:
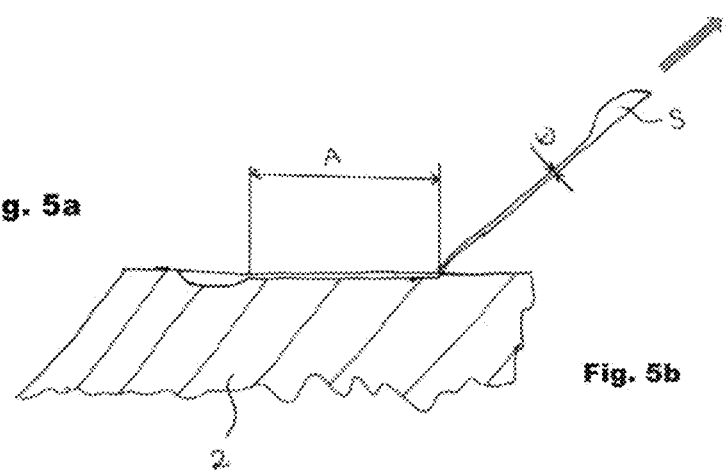
FIG. 5b shows a detailed view of the skin detachment test as it progresses further.

It is interesting that in any case in the region of the outer enrichment zone, there appears to be a definite boundary layer starting at which the strength of the plastic that forms the wall of the casing decreases significantly. If a casing that has been produced according to this first embodiment is cut diagonally with a blade so that a diagonally protruding shaving is produced, as shown in FIGS. 5*a* and 5*b*, it is then possible to peel a skin off the surface of the casing by pulling on the shaving with the unaided hand, regardless of the depth of the cut. The skin is relatively strong and in most cases, only tears after a detachment length of 4 cm or more has been pulled off.

In general, in a way that is applicable beyond this embodiment, it can be said that skin detachment tests of this kind have shown that a particularly good sharpenability is achieved whenever such skins can be pulled off with a thickness of 0.08 mm to 0.25 mm.

To the extent that it has been possible to explain up to this point, it appears to be the case that the sharpener blade is then not reliant on having to completely cut the relatively strong skin and instead, it appears that a mix of cutting and tearing occurs, which has a facilitating effect.

Second Embodiment

To produce the second embodiment, 60% by weight AES (ROTEC A702™) and 40% by weight TPC-ET (Amitel EM400™) with the addition of 3% pigments (preferably black pigments of the above-mentioned type) are brought into the injection molding-ready, viscous state at a temperature of preferably 250° C.+/−10° C. and are uniformly mixed in the process. No other fillers or auxiliary materials are added.

This compound, as described above for the first embodiment, is processed with the aid of the machines described therein, which is also true for the injection molding.

The casing 2 produced in this way particularly preferably looks like the one shown in FIG. 1.

The casing produced in this way exhibits an extremely scratch-resistant outer circumference surface with a silk-matt gloss. It is resistant to the migration of pigment core components and is easy to decorate.

The tests using RAMAN spectroscopy, as will be explained in greater detail below, demonstrate that when this plastic mix is injection molded, a readily apparent outer enrichment zone and an inner enrichment zone that is just as readily apparent are formed, whose magnitude varies within the above-described ranges depending on the intensity of the cooling of the injection mold.

Comparison Example

For the comparison example, 60% by weight SAN (LURAN 378P™) and 40% by weight of a usually non-polar SBS block copolymer (ALLRUNA W55™) with the addition of 3% pigments (preferably black pigments of the above-mentioned type) are brought into the injection molding-ready, viscous state at a temperature of preferably 250° C.+/−10° C. and are uniformly mixed in the process. No other fillers or auxiliary materials are added. ALLRUNA W55™ is a brand name of the company ALLOD Werkstoff GmbH & Co. KG, 91593 Burgbernheim, Germany.

This compound, as described above for the first embodiment, is processed with the aid of the machines described therein, which is also true for the injection molding.

The casing 2 produced in this way particularly preferably looks like the one shown in FIG. 1.

The casing produced in this way exhibits a matte outer surface and neither a significant outer enrichment zone nor an inner enrichment zone. Instead, the materials remain homogeneously mixed until solidification. The skin detachment test also cannot be performed because the casing clearly has a homogeneous strength.

RAMAN Spectroscopy for Determining Concentration

For ascertaining the concentrations that are particularly found in the outer and inner enrichment zones according to the present disclosure, RAMAN spectroscopy is the method of choice.

The above-described fracture plane turned out to be poorly suited to the performance of a RAMAN spectroscopy. Instead of this, the tests were performed on a cross-section that was produced by first cutting or sawing through the casing transversely to its longitudinal axis and the cross-section that had thus been exposed was then ground.

To clarify the local proportions of SAN and TPC-ET, the RAMAN spectra were measured across the cross-section of the casing that had been produced according to the first embodiment. The measurement was performed with a RAMAN spectrometer from the Almega series produced by the company Thermo Fisher Scientific, 168 Third Avenue, Waltham, Mass. USA 02451.

In order to calibrate the device and be able to assign the individual parts of each respective spectrum, first the raw materials were measured. In other words, plates were produced that consisted of up to 100% by weight SAN and up to 100% by weight TPC-ET. If a measuring point comes to rest fully on the respective plate and the thickness of the plate exceeds 2/10 mm, then the dimensions of the test pieces do not matter. Individual measurements were performed on the two plates by themselves.

Figure 6:
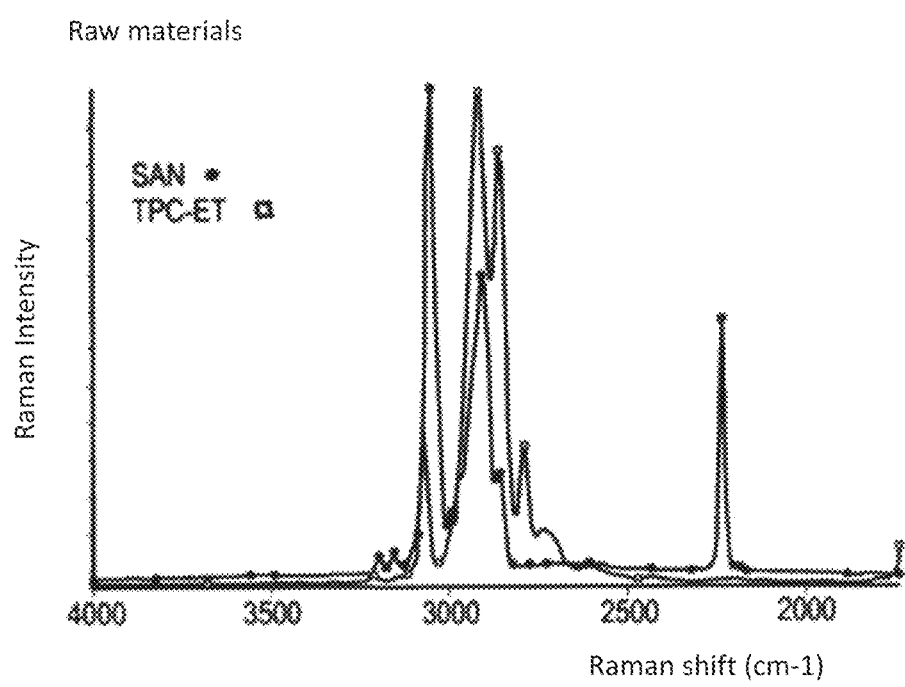
FIG. 6 shows the respective RAMAN spectra for SAN and TPC-ET.

The spectra obtained in this way were plotted in the graph according to FIG. 6. The dot-and-dash line shows the spectrum recorded for SAN and the solid continuous line shows spectrum recorded for TPE-ET.

The area of the peak that reaches its maximum at 3050 cm−1 was used for the SAN ascertainment; the area of the peak whose maximum is at 2250 cm−1, which is also characteristic for the SAN, could likewise be used; it yields comparable values and therefore does not have to be separately considered below and can instead be disregarded.

Figure 7:
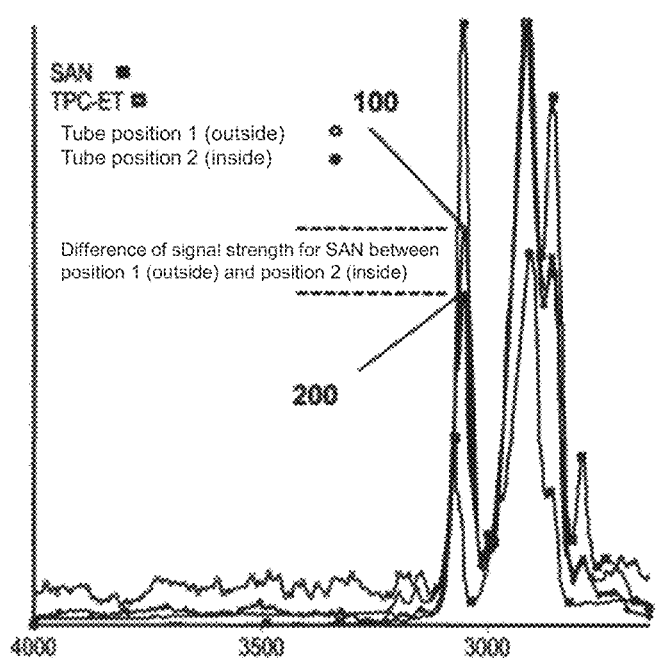
FIG. 7 shows the RAMAN spectra for SAN and TPC-ET for the pure substances and at 2 different measurement points 100 and 200 on the sectional plane of the casing.

Then the points 100 and 200 identified in FIG. 4 were measured one after the other. The two spectra recorded in this case were superposed as shown in FIG. 7. It is already clear from these figures that different concentrations of SAN and TPC-ET are found at the points 100 and 200.

Figure 8:
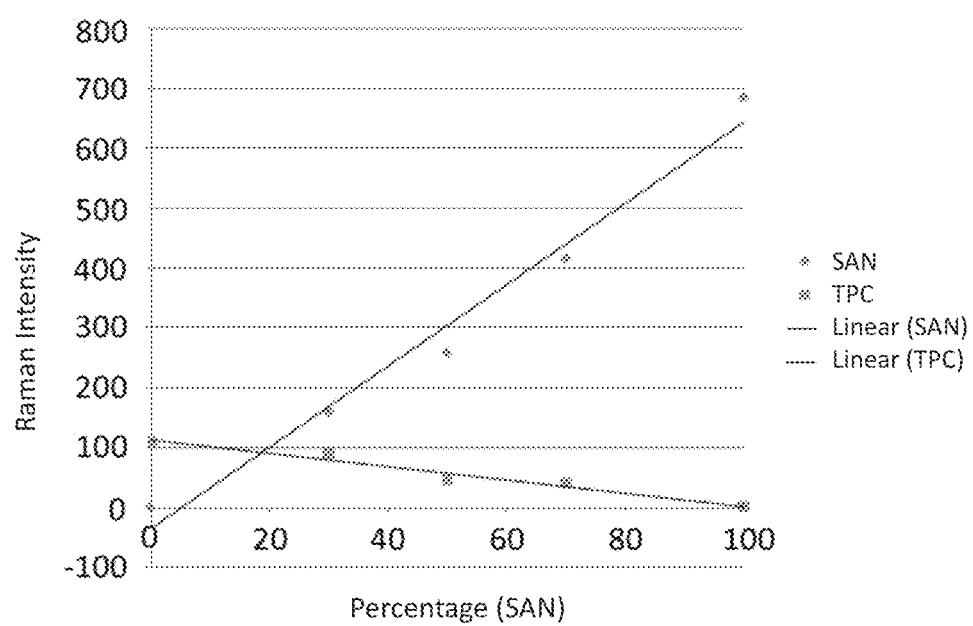
FIG. 8 shows the RAMAN intensity of the spectra recorded for samples that contained 0% by weight SAN, 30% by weight SAN, 50% by weight SAN, 70% by weight SAN, and 100% by weight SAN and the complementary percentages of TPE-ET.

Then in addition to the above-mentioned samples containing 0% by weight and 100% by weight SAN, different mixes of SAN and TPC-ET are systematically produced and, through suitable temperature control, processed to produce the above-mentioned boundary layer-free plates, namely mixes that contained 30% by weight, 50% by weight, and 70% by weight SAN and the complementary percentages of TPC-ET. The RAMAN intensity of the spectra that were recorded for the individual representatives of this sample series were plotted in the graph that is shown in FIG. 8. In FIG. 8, it is clear that each mixing ratio can be assigned to a characteristic RAMAN intensity and there is a linear relationship between the percentage by weight of the SAN, the TPC-ET, and the respective RAMAN intensities that are to be measured for them.

Figure 9:
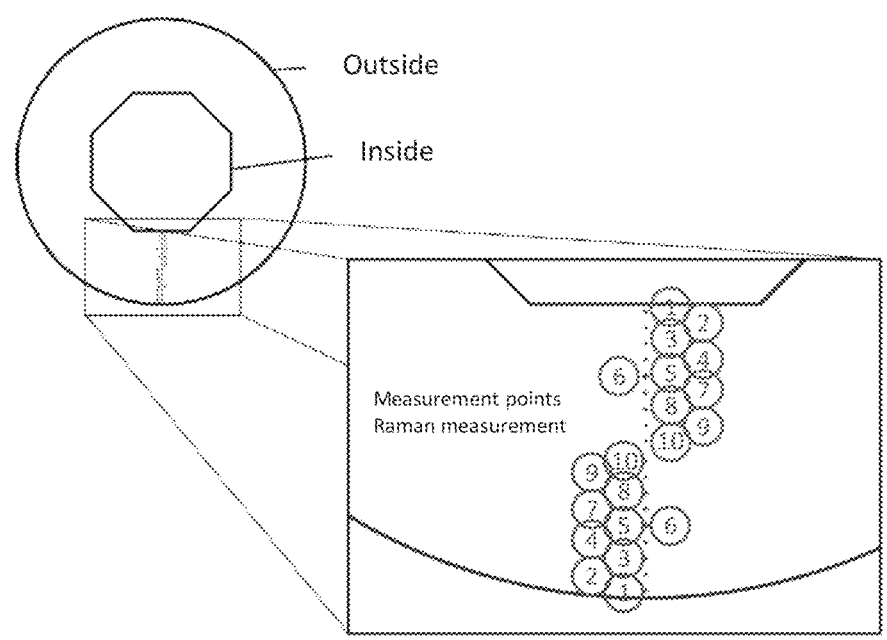
FIG. 9 shows the steps in which the sectional plane of the casing, which was produced according to the $1^{st}$ embodiment, was measured using RAMAN spectroscopy.

Then—as has been described above—the ground cross-section of the casing 2, which was produced in accordance with the first embodiment, was measured in a way that matches the sequence shown in FIG. 9 step for step. Measurements were carried out point by point starting from the outside and continuing in the radial direction to the middle of the casing cross-section and carried out point by point starting from the inside and continuing in the radial direction to the middle of the casing cross-section.

Figure 10:
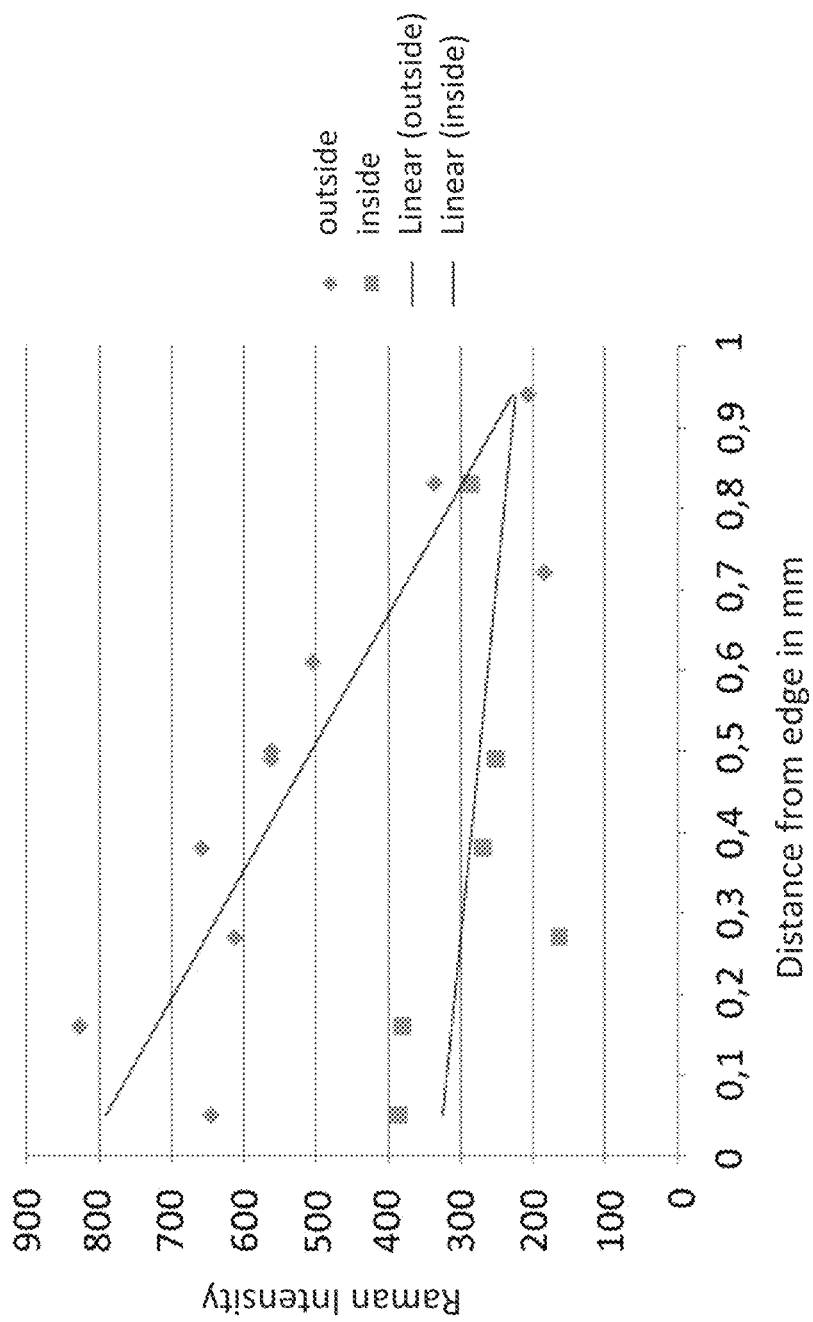
FIG. 10 shows how the concentration of SAN and TPC-ET changes in the radial direction over the cross-section of the casing.

These measurements yield the graph that is shown in FIG. 10. The plastic compound used for the injection molding had a mixing ratio of ⅔ SAN to ⅓ TPC-ET. Starting from this and taking into consideration the spread of measurement results, it is evident that a partial separation has occurred during the injection molding process in the injection molding tool.

In this case, the concentration of SAN at the surface of the outer circumference surface of the casing is approx. 100% by weight.

At the surface of the inner circumference surface, the concentration of SAN is only approx. 70% by weight.

The Structural Embodiment of the Pencil

Figure 2:
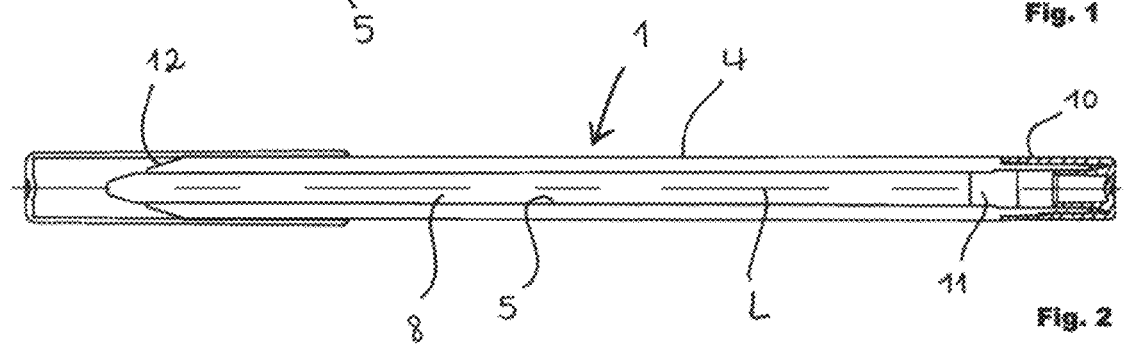
FIG. 2 shows the entire pencil according to the present disclosure in a longitudinal section through the center.

The pencil 1 according to the present disclosure is embodied as shown in FIGS. 2, 3, and 4. As a rule, it has an outer diameter of approx. 6 to 16 mm.

At its center, it has a receptacle for the pigment core 8 that advantageously constitutes a form-fitting rotation prevention means. Its cross-section can be circular, but is preferably oval, polygonal, or octagonal in order to insure a better hold between the pigment core 8 and the casing 2. The distance between opposing flat sides of the octagon is preferably between 3 and 5 mm. The wall thickness of the casing 2 is preferably in the range from 1.5 to 3 mm. The length of the pencil 1, i.e. its length in the direction of its longitudinal axis L, is generally greater than 85 mm, usually greater than 100 mm, and up to 180 mm.

The receptacle for the pigment core 8 preferably extends through the entire casing 2 in the direction of its longitudinal axis L, i.e. as a semifinished product, the casing 2 forms a tube. This facilitates the pigment core casting. This is because at the end at which it forms the cone that is to be described in greater detail below, the casing, for purposes of the pigment core casting, can be inserted into a mold that seals it shut and then in the same way, gives the end of the pigment core in the region of the cone a corresponding, as a rule likewise conically tapering, shape. The pigment core compound is then poured in from the other end of the casing at which the seat is located and fills the pigment core receptacle in the casing 2 and the mold cavity that models the tip of the pigment core 8. A casing consisting of plastic like the one according to the present disclosure can be inserted particularly well into a mold that closes it in a sealed fashion for purposes of the pigment core casting since the plastic of the casing, compared to a wooden casing, is reversibly elastic, i.e. can be inserted or clamped into a corresponding mold in a sealed fashion. The very smooth outer surface of the casing helps to achieve a reliable seal.

The one end of the pencil 1 tapers to form a cone 12, preferably with a cone angle Pi of between 20° and 60°. In this way, this end contributes to producing the sharpened end that is known from a normal wooden pencil and thus to form a starting surface, which in the first sharpening is correctly positioned relative to the sharpener blade and enables the sharpener blade to remove a shaving over its entire length.

The other end of the pencil 1 preferably has a seat 9 in the form of a recessed region on its outer diameter. A closing cap 10 can be placed onto this seat and preferably, a detent engagement is produced between the seat 9 and the closing cap 10. In order to preserve the pigment core as much as possible and to prevent migrations, an additional seal is usually provided under the cap, often in the form of a stopper or silicone stopper 11. At the end where the pigment core 8 protrudes out from the casing 2, the finished pencil 1 is generally kept fresh by means of a cap 12 that is placed onto it. The very smooth and scratch-resistant outer surface that is achieved according to the present disclosure fosters the ability of the cap 10 to be slid on in a good and reliable way. The surface achieved according to the present disclosure is so scratch resistant that even after removing and replacing the cap 10 thirty times, no dulling of the surface over which the cap 10 travels occurs that is visible to the naked eye due to micro-scratches and the like extending in the direction of the longitudinal axis of the pencil. The cap 10 is embodied so that it is slightly undersized, i.e. with a slightly smaller inner diameter compared to the outer diameter of the casing 2. The cap 10 that is produced in this way can be slid onto the surface of the casing 2, which is achieved according to the present disclosure, in a suction-inducing fashion and because of its smooth property, can also be pulled off from it again (no stick/slip).

CONCLUDING GENERAL REMARKS

Independent protection, possibly also enhanced with other features from the above description and/or the already existing claims, is claimed for a pencil for applying a coloring and/or cosmetic substance, having a pigment core composed of the substance that is to be applied and a one-piece injection-molded casing encompassing the pigment core that is composed of a thermoplastic material that consists of a mix of a first plastic and a second plastic and that features the fact that after the outer circumference surface is cut into in such a way that a shaving protrudes from the outer circumference, it is possible to peel a skin off the surface of the casing by pulling on the shaving with the unaided hand.

Independent protection, possibly also enhanced with other features from the above description and/or the already existing claims, is claimed for a pencil for applying a coloring and/or cosmetic substance, having a pigment core composed of the substance that is to be applied and a one-piece injection-molded casing encompassing the pigment core that is composed of a thermoplastic material that consists of a mix of a first plastic and a second plastic and the pencil features the fact that its casing has a structure composed of two layers that can be separated from each other by hand and preferably, the one of these two layers that is closer to the surface is thinner.

Independent protection, possibly also enhanced with other features from the above description, is claimed for a pencil for applying a coloring and/or cosmetic substance, having a pigment core composed of the substance that is to be applied and a one-piece injection-molded casing encompassing the pigment core that is composed of a thermoplastic material that consists of a mix of a first plastic and a second plastic, and which pencil features the fact that its casing, viewed in the radial direction, has an outer enrichment zone with a higher concentration of the first plastic than in the middle region.

In this regard, it should be noted that the formation of an inner enrichment zone, possibly through a suitable temperature control at the inner circumference of the casing can be achieved. In instances in which this claim is in force, the above statements apply analogously and only certain limitations, which are based in the inner enrichment zone (which is not present or is purely optional in this variant), are omitted.

Independent protection, possibly also enhanced with other features from the above description and/or the already existing claims, is claimed for a pencil for applying a coloring and/or cosmetic substance, having a pigment core composed of the substance that is to be applied and a one-piece injection-molded casing encompassing the pigment core that is composed of a thermoplastic material that consists of a mix of a first plastic and a second plastic, and which pencil features the fact that its casing, viewed in the radial direction, has an inner enrichment zone with a higher concentration of the first plastic than in the middle region.

In this regard, it should be noted that the formation of an outer enrichment zone, possibly through a suitable temperature control at the outer circumference of the casing can be achieved; the thermal energy that is no longer needed after the injection into the cavity is then removed from the plastic compound of casing essentially via its inner circumference surface. In instances in which this claim is in force, the above statements apply analogously and only certain limitations, which are based in the outer enrichment zone (which is not present or is purely optional in this variant), are omitted.

REFERENCE NUMERAL LIST 1 pencil
2 casing
3 cross-section of the casing
4 outer circumference
5 inner circumference
6 outer enrichment zone
7 inner enrichment zone
8 pigment core
9 seat
10 closing cap
11 silicone stopper
12 cone
100 measurement point 1
200 measurement point 2
L longitudinal axis of the pencil and its casing
S shaving
D thickness of the skin
A detachment length
Pi cone angle

The invention claimed is:

1. A pencil for applying a coloring and/or cosmetic substance, comprising:
a pigment core composed of the substance that is to be applied and a one-piece injection-molded casing encompassing the pigment core that is composed of a thermoplastic material that consists of a mix of a first plastic and a second plastic that are mixed with each other;
wherein the casing, respectively viewed in a radial direction, has an outer enrichment zone with a higher concentration of the first plastic than in a middle region of the casing; and the casing, respectively viewed in the radial direction, has an inner enrichment zone with a higher concentration of the first plastic than in the middle region.

2. The pencil of claim 1, wherein the concentration of the first plastic decreases continuously from the outer enrichment zone and from the inner enrichment zone toward the middle region.

3. The pencil of claim 1, wherein over at least 80% of its cross-section area, the plastic casing is composed of both the first and the second plastics, with the two plastics being encountered in percentages by weight that differ by location.

4. The pencil of claim 1, wherein the casing consists predominantly, at least 85% by weight, of the first and second plastics, plus any fillers and auxiliary materials such as pigments.

5. The pencil of claim 1, wherein one of the first and second plastics is a weakly polar plastic with an electron negativity difference $\Delta EN$ in the range $0.3 \leq \Delta EN \leq 0.5$.

6. The pencil of claim 1, wherein one of the first and second plastics is a strongly polar plastic with an electron negativity difference $\Delta EN$ in the range $0.5 < \Delta EN \leq 1.7$.

7. The pencil of claim 1, wherein the first plastic is an AES.

8. The pencil of claim 1, wherein the second plastic is a TPE.

9. The pencil of claim 1, wherein the thermoplastic material comprising the casing is set up so that the first plastic has a weight proportion of at least 45% by weight.

10. The pencil of claim 1, wherein an upper limit for the first plastic in the injection-ready mix is 85% by weight.

11. The pencil of claim 1, wherein at an outer circumference surface, the casing has a mathematically determined gloss level GU of more than 30 GU.

12. The pencil of claim 1, wherein the casing has a structure composed of two layers that can be separated from each other.

13. The pencil of claim 1, wherein the plastic casing consists of a non-foamed plastic.

14. The pencil of claim 1, wherein the casing is embodied in the form of a tube that is open at both ends.

15. The pencil of claim 1, wherein at one end, the casing tapers conically.

16. The pencil of claim 1, wherein at one end, the casing has a shoulder with a reduced diameter.

17. The pencil of claim 1, wherein at an end of the pencil, an end cap is fastened; which closes one end of the casing.

18. A method for producing a pencil with a casing according to claim 1, comprising the steps of:
- a plasticized, injection-moldable compound is produced, composed of a first and second plastic material that are completely mixed with each other,
- the plastic materials are chosen so that they have solidification behaviors that differ from each other such that they separate when they come into contact with a cooled mold surface,
- the compound is injected at a high pressure of at least 900 bar into a mold cavity of an injection mold forming the casing of the pencil,
- with the injection mold being intensively cooled such that directly against its wall surface that produces the mold cavity and over the entire length of the mold cavity, predominantly the first plastic material solidifies and is thus enriched against the wall surface,
- and then the two plastic materials in a region of the casing, which is underneath a region of an outer circumference surface of the casing, solidify together with less separation than in the region of the outer circumference surface or without any separation.

19. The method of claim 18, wherein in the region of the outer circumference surface of the casing, no mold parting line is formed by the injection mold.

20. The method of claim 18, wherein the completely injection molded casing is ejected from the mold in the direction of its longitudinal axis L.

21. The method of claim 18, wherein a pigment core receptacle in a center of the casing is formed by a pin that constitutes a mold core, which is removed together with the casing when the casing is ejected from the injection mold.

22. The method of claim 18, wherein the wall surface of the injection mold that forms the outer circumference surface of the casing has a roughness depth $Rz \leq 5$ µm.

23. The method of claim 18, further comprising casting a pigment core, wherein the casing is inserted into a mold that seals the casing at a tapering end of the casing and that forms a subsequent shape of an unused tip of the pigment core, and a compound that forms the pigment core is poured in at the other end of the casing.

* * * * *